United States Patent
Chuang et al.

(10) Patent No.: US 9,461,411 B2
(45) Date of Patent: Oct. 4, 2016

(54) CARD CONNECTOR HAVING ELECTRO-PERMANENT MAGNET

(71) Applicant: FOXCONN INTERCONNECT TECHNOLOGY LIMITED, Grand Cayman (KY)

(72) Inventors: Shun-Jung Chuang, New Taipei (TW); Wei-Ta Tseng, New Taipei (TW); Hao-Chang Zhang, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/887,508

(22) Filed: Oct. 20, 2015

(65) Prior Publication Data

US 2016/0111826 A1 Apr. 21, 2016

(30) Foreign Application Priority Data

Oct. 20, 2014 (TW) .............................. 103136148 A

(51) Int. Cl.
*H01R 11/30* (2006.01)
*H01R 13/6581* (2011.01)
*H01R 12/70* (2011.01)
*H01R 43/20* (2006.01)

(52) U.S. Cl.
CPC .......... *H01R 13/6581* (2013.01); *H01R 11/30* (2013.01); *H01R 12/7076* (2013.01); *H01R 43/205* (2013.01)

(58) Field of Classification Search
CPC .. H01R 11/30; H01R 13/60; H01R 13/6205; H01R 13/7037

USPC .......................................................... 439/38
See application file for complete search history.

(56) References Cited

U.S. PATENT DOCUMENTS

| 3,671,893 | A | 6/1972 | Edgar et al. | |
|---|---|---|---|---|
| 5,448,435 | A | 9/1995 | Nakazawa et al. | |
| 6,932,654 | B2 * | 8/2005 | Washino | H01R 27/00 439/159 |
| 7,328,843 | B2 * | 2/2008 | Ko | H01R 13/6599 235/441 |
| 7,865,210 | B2 | 1/2011 | Wang et al. | |
| 8,777,669 | B2 * | 7/2014 | Hu | H01R 12/714 439/159 |
| 8,960,818 | B2 * | 2/2015 | Myers | 312/319.2 |
| 9,124,042 | B2 * | 9/2015 | Matsunaga | H01R 13/74 |
| 9,135,944 | B2 * | 9/2015 | Jenks | |
| 2001/0036759 | A1 * | 11/2001 | Ikemoto | H01R 13/24 439/159 |
| 2009/0253280 | A1 * | 10/2009 | Yu | G06K 13/0806 439/159 |
| 2010/0288838 | A1 * | 11/2010 | Chen | G06K 13/0806 235/435 |
| 2013/0135067 | A1 | 5/2013 | Choi | |
| 2013/0267106 | A1 * | 10/2013 | Jenks | G11B 17/00 439/160 |
| 2014/0256163 | A1 * | 9/2014 | Kuo | H01R 13/6205 439/39 |

* cited by examiner

*Primary Examiner* — Chandrika Prasad
(74) *Attorney, Agent, or Firm* — Ming Chieh Chang; Wei Te Chung

(57) ABSTRACT

A card connector (100) includes an insulative housing (1), a number of terminals (2) affixed in the insulative housing, a shielding shell (4) attached to the insulative housing to form a cavity (11), a tray (3) insertable in the cavity; and an EPM (5) affixed in the insulative housing. The tray is attracted by the EPM under a first current in one direction during tray-insertion and released by the EPM under a second current in opposite direction during tray-ejection.

20 Claims, 8 Drawing Sheets

CARD CONNECTOR HAVING ELECTRO-PERMANENT MAGNET

BACKGROUND OF THE INVENTION

1. Field of the Invention

The present invention relates to a card connector, and more particularly to a card connector utilizing an EPM (Electro-Permanent Magnet).

2. Description of Related Art

U.S. Pat. No. 7,865,210 issued on Jan. 4, 2011 discloses a card connector comprising a housing defining an opening, a tray inserted into the opening, a pair of elastic beams latching the tray, and an ejecting portion adapted for ejecting the tray.

U.S. Pat. No. 3,671,893 issued on Jun. 20, 1972 discloses a high speed magnetically operated device comprising a magnet assembly including a cobalt-rare earth permanent magnet mounted between a pair of pole pieces having oppositely poled pole faces, a low volume ferromagnetic armature, and a restoring means. The permanent magnet and pole pieces have a relatively thin field direction dimension as compared to the area coordinate dimensions, and a flux cancellation coil wound about the permanent magnet that selectively produces a magnetic field opposed to the polarity of the permanent magnet. The low volume ferromagnetic armature is attracted by magnetic forces to a latched position against the pole faces of the magnet assembly, and movable under the influence of a biasing force to a released position. The restoring means is for returning the armature to the latched position.

A card connector having an EPM attracting a tray for easy operation is desired.

SUMMARY OF THE INVENTION

Accordingly, an object of the present invention is to make tray operation easy.

In order to achieve the object set forth, a card connector includes an insulative housing, a number of terminals affixed in the insulative housing, a shielding shell attached to the insulative housing to form a cavity, a tray insertable in the cavity, and an EPM affixed in the insulative housing. The tray is attracted by the EPM under a first current in one direction during tray-insertion and released by the EPM under a second current in opposite direction during tray-ejection.

It is easy to operate the tray by only energizing current to the EPM in different directions.

Other objects, advantages and novel features of the invention will become more apparent from the following detailed description when taken in conjunction with the accompanying drawings.

DETAILED DESCRIPTION OF THE PREFERRED EMBODIMENT

Figure 1:
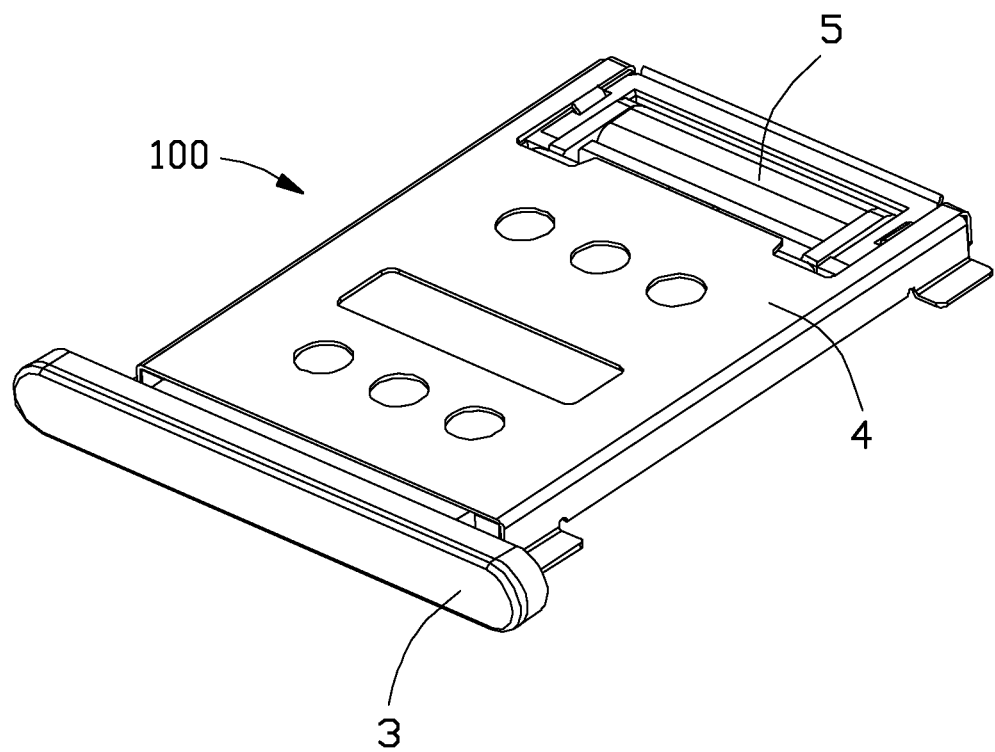
FIG. 1 is an assembled perspective view showing a card connector.

Reference will now be made in detail to the preferred embodiment of the present invention. Referring to FIGS. 1-6, a card connector 100 comprises an insulative housing 1, a plurality of terminals 2 affixed in the insulative housing 1, a shielding shell 4 attached to the insulative housing 1 to form a cavity 11, a movable member insertable in the cavity 11, and an EPM (Electro-Permanent Magnet) 5 affixed in the insulative housing 1. The movable member is formed into a card 200 or a tray 3 carrying the card 200.

The insulative housing 1 defines a groove 12 behind the cavity 11 for receiving the EPM 5.

Figure 2:
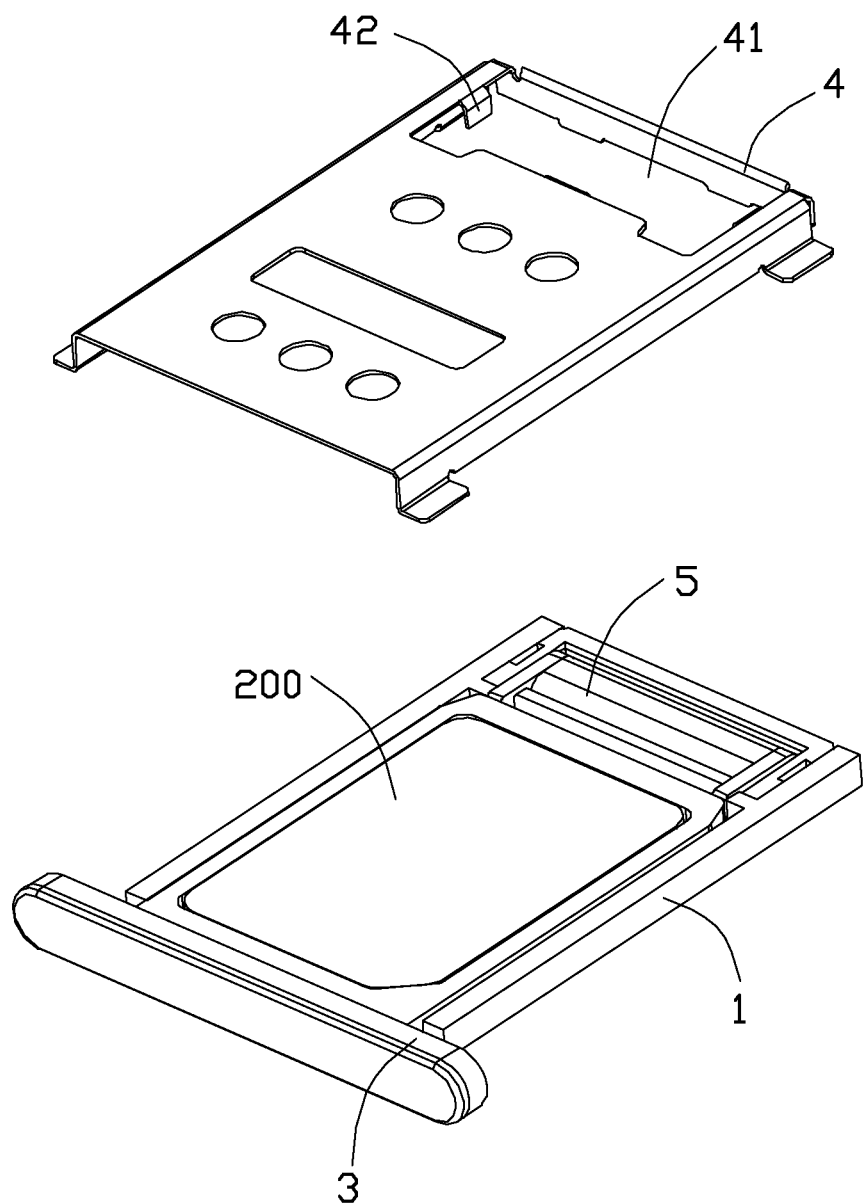
FIG. 2 is partly assembled perspective view showing the card connector, with a shielding shell separated.
Figure 3:
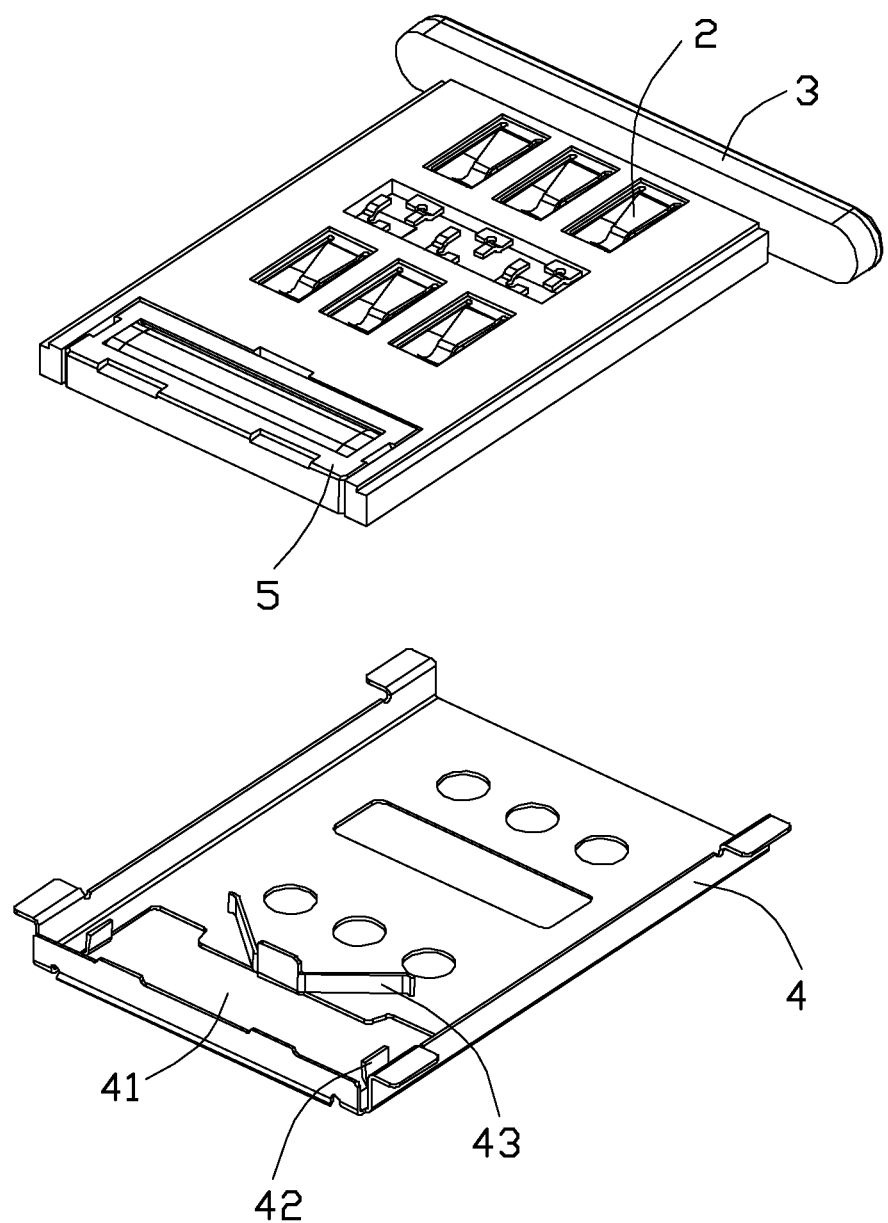
FIG. 3 is another view similar to FIG. 2, taken from another aspect.
Figure 4:
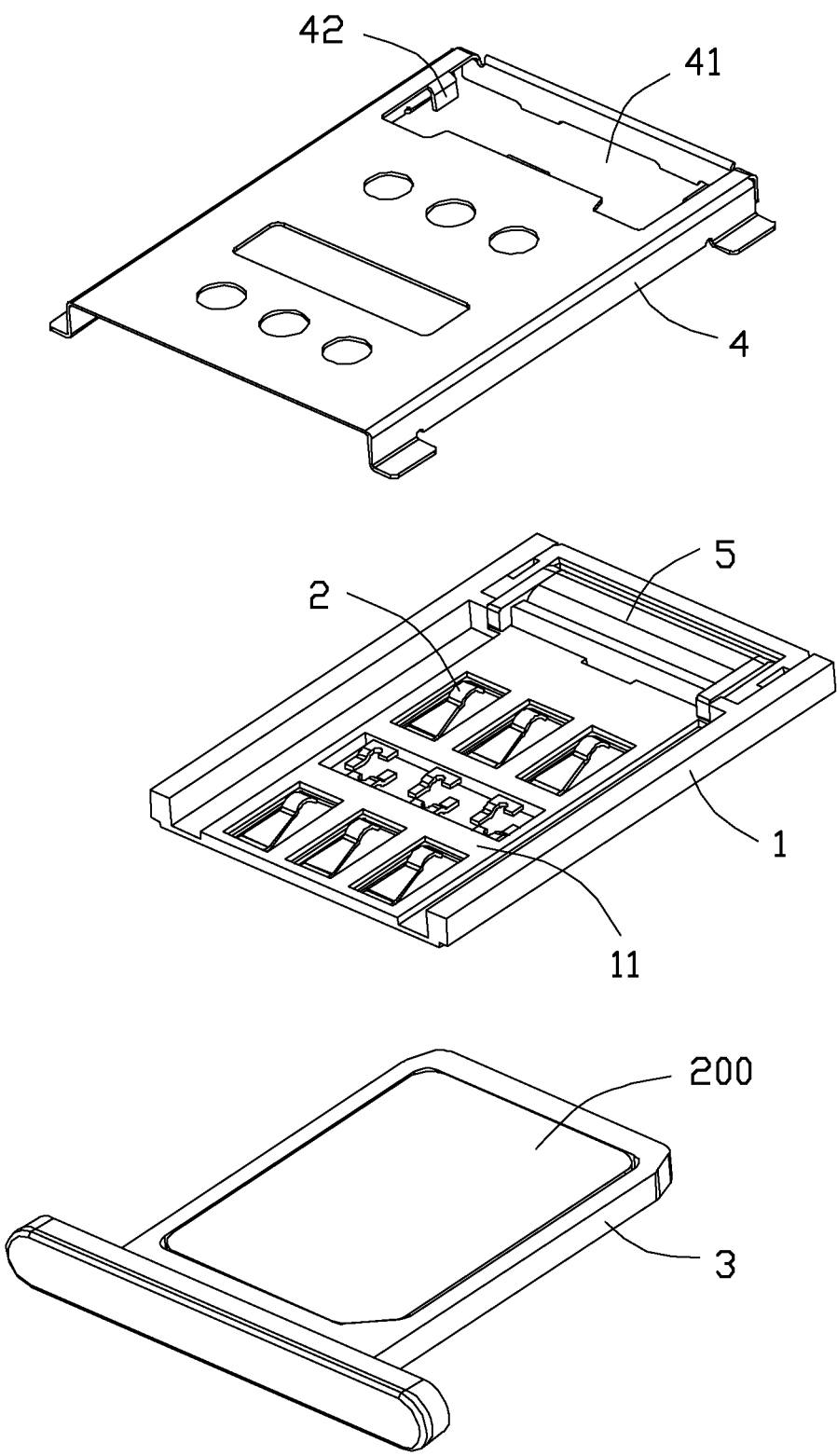
FIG. 4 is an exploded view showing the card connector.

Referring to FIGS. 2 and 3, the shielding shell 4 has an elastic portion 43 formed into a pair of elastic beams positioned at a rear portion of the cavity 11 and extending forwardly. The shielding shell 4 defines an opening 41 corresponding to the groove 12. The shielding shell 4 is formed with a pair of latching portions 42 at opposite sides of the opening 41.

Figure 5:
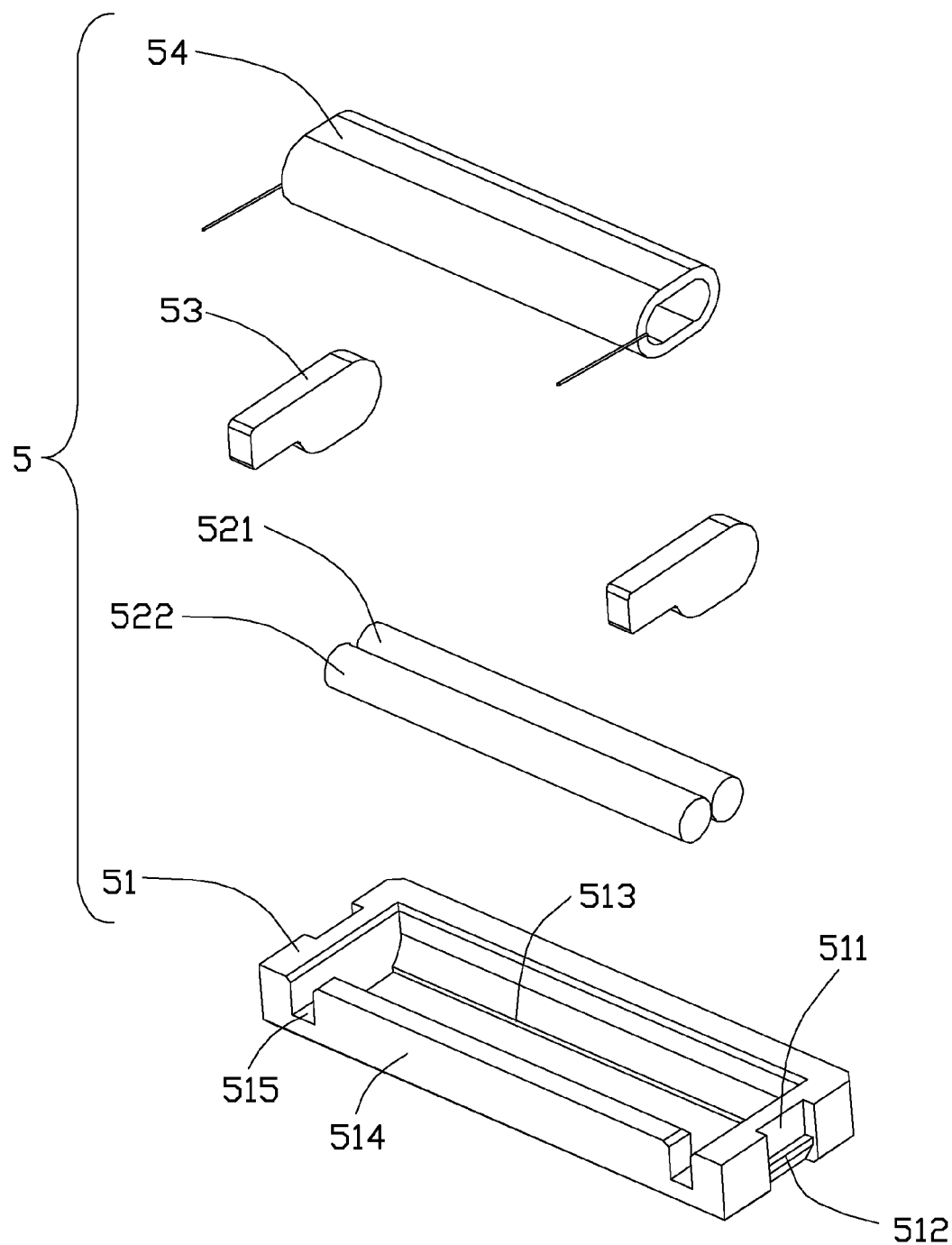
FIG. 5 is an exploded view showing the EPM referred in a first embodiment.

In a first embodiment in FIG. 5, the EPM 5 includes a first magnet 521 made from soft magnetic material, a second magnet 522 made from hard magnetic material, a wire 54 encircling around the first magnet 521 and the second magnet 522 for energizing current, and a pair of conductive portions, ex., hipercoes 53, respectively connected with opposite ends of the first magnet 521 and the second magnet 522, and a cage 51 encasing the first magnet 521, the second magnet 522, the wire 54 and the hipercoes 53. The cage 51 comprises a slot 513, a side wall 514 defining a pair of cutouts 515, pair of engaging portions 512 and a pair of recesses 511 above the pair of engaging portions 512. The pair of hipercoes 53 respectively extend outwardly from the cage 51 through the cutouts 515.

Figure 6:
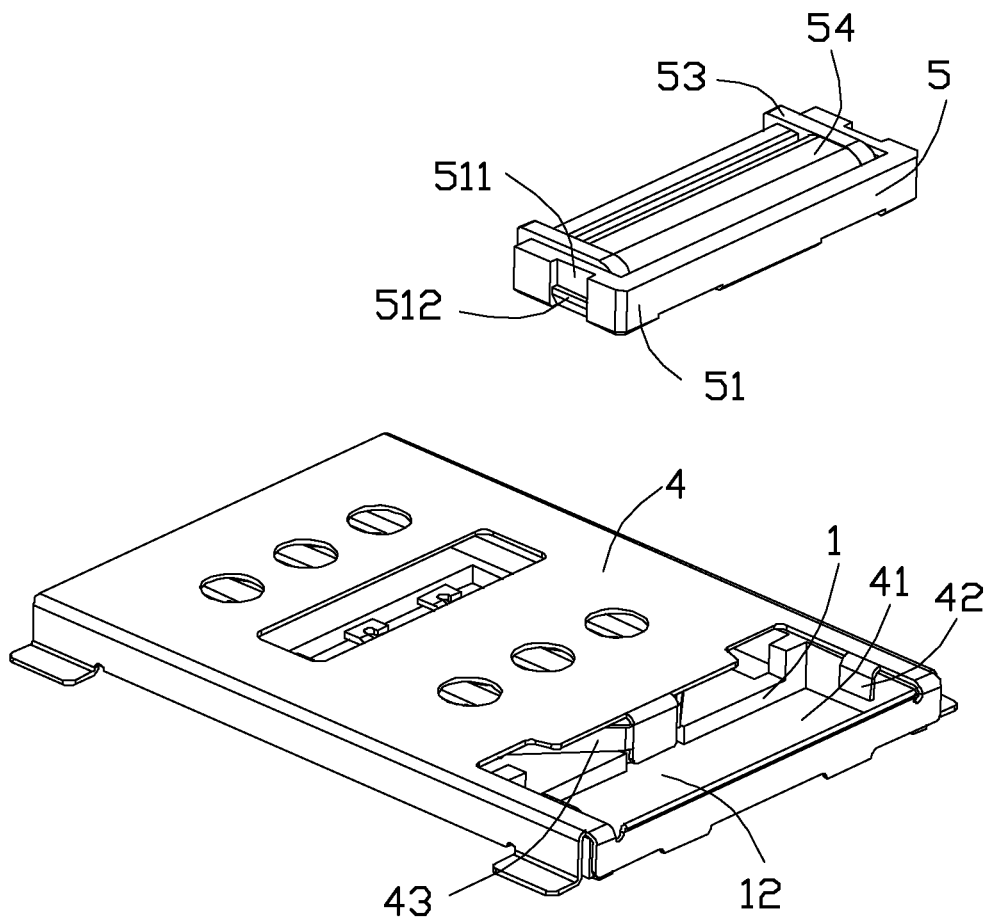
FIG. 6 is a perspective view showing the card connector before the EPM is mounted in the card connector.

Referring to FIG. 6, in assembling of the card connector 100, the shielding shell 4 is mounted onto the insulative housing 1. Then, the EPM 5 is assembled into the groove 12 through the opening 41. Each latching portion 42 slides across corresponding engaging portion 512 to latch with corresponding recess 511.

Before a card-insertion, the first magnet 521 and the second magnet 522 have opposite polarities. The magnetic field is formed along the first magnet 521, one hiperco 53, the second magnet 522, and the other hiperco 53. The magnetic force produced by the EPM 5 is weak.

In card-insertion, the wire 54 is energizing a first current along a first direction to change the polarity of the first magnet 521. The first magnet 521 has a polarity same to that of the second magnet 522. The magnetic force is enhanced to attract the tray 3. The elastic portion 43 is compressed. When the first current is cut off, the tray 3 is maintained to be attracted by the EPM 5.

In card-ejection, the wire 54 is energizing a second current along a second direction opposite to the first direction to change the polarity of the first magnet 521. The first magnet 521 has a polarity opposite to that of the second magnet 522. The magnetic force is weaker than a restoring force of the elastic portion 43. The tray 3 is ejected by the elastic portion 43.

Figure 7:
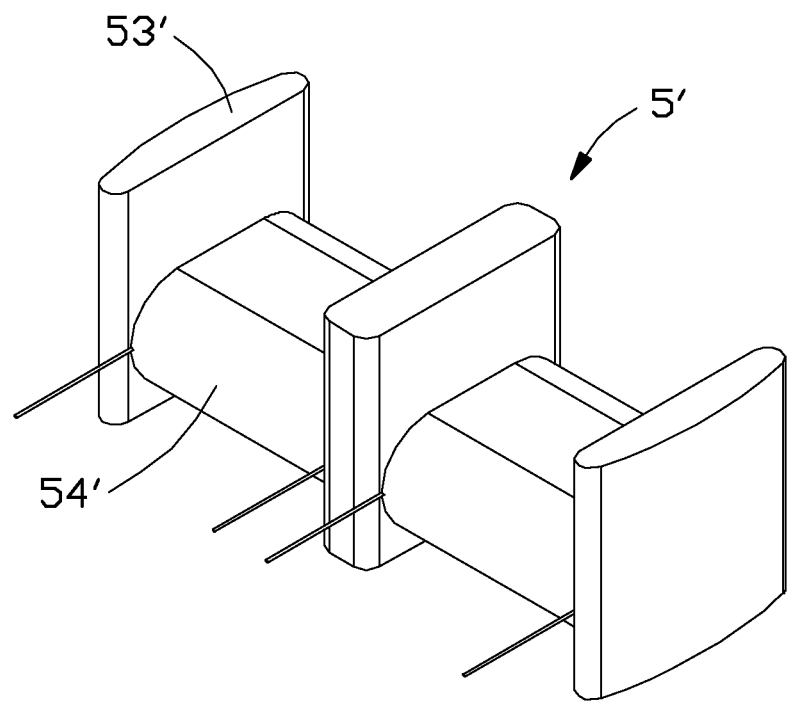
FIG. 7 is an assembled view showing the EPM referred in a second embodiment.
Figure 8:
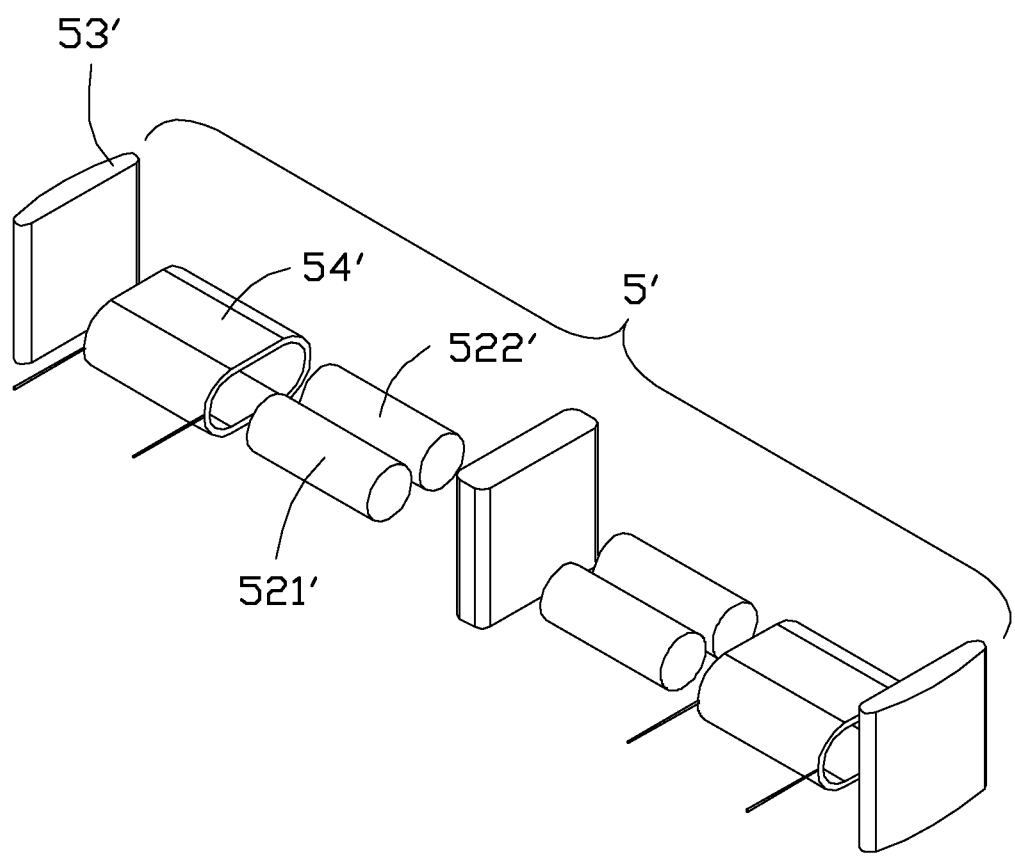
FIG. 8 is an exploded view of the EPM in the second embodiment in FIG. 7.

Referring to FIGS. 7-8, in a second embodiment, the EPM 5' comprises a plurality of adjacent magnet assemblies each having a wire energizing current, a first magnet 521', a second magnet 522', a pair of conductive portions, ex., hipercoes 53', respectively connected with opposite ends of the first magnet 521' and the second magnet 522'. A cage in the EPM 5' is omitted. The first magnets 521' in adjacent magnet assemblies are aligned with each other and have same polarities. The second magnets 522' in adjacent magnet assemblies are aligned with each other and have same polarities. The EPM 5' referred in the second embodiment produces a magnetic force stronger than that produced from the EPM 5 referred in the first embodiment.

Utilizing EPM 5, 5' to attract the tray 3 would simplifying the configuration of the card connector 100, easing the operation of tray 3 and keep stability of the card insertion.

It is to be understood, however, that even though numerous characteristics and advantages of the present invention have been set forth in the foregoing description, together with details of the structure and function of the invention, and changes may be made in detail, especially in matters of shape, size, and arrangement of parts within the principles of the invention to the full extent indicated by the broad general meaning of the terms in which the appended claims are expressed.

What is claimed is:

1. A card connector comprising:
   an insulative housing having a groove;
   a plurality of terminals affixed in the insulative housing;
   a shielding shell attached to the insulative housing to form a cavity;
   a movable member insertable in the cavity; and
   an EPM (Electro-Permanent Magnet) affixed in the insulative housing, wherein the movable member is attracted by the EPM under a first current in one direction during card-insertion and released by EPM under a second current in an opposite direction during card-ejection.

2. The card connector as claimed in claim 1, wherein said movable member is formed into a tray, and the tray remains attracted by EPM when the first current is cut off.

3. The card connector as claimed in claim 2, wherein said shielding shell has an elastic portion positioned at a rear portion of the cavity and extending forwardly, and the elastic portion is compressed by the tray during card-insertion and resiliently restores to eject the tray during card-ejection.

4. The card connector as claimed in claim 2, wherein said insulative housing defines a groove behind the cavity for receiving the EPM.

5. The card connector as claimed in claim 4, wherein said shielding shell defines an opening, and the EPM is assembled into the groove through the opening after the shielding shell is mounted onto the insulative housing.

6. The card connector as claimed in claim 5, wherein said shielding shell is formed with a pair of latching portions, and said EPM comprises a pair of engaging portions and a pair of recesses above the pair of engaging portions, and each latching portion slides across a corresponding engaging portion to latch with a corresponding recess.

7. The card connector as claimed in claim 1, wherein said EPM includes a wire, a first magnet, a second magnet, and a pair of conductive portion respectively connected with opposite ends of the first magnet and the second magnet.

8. The card connector as claimed in claim 7, wherein said EPM further includes a cage encasing the first magnet, the second magnet, the wire and the Hipercoes.

9. The card connector as claimed in claim 8, wherein said cage comprises a side wall defining a pair of cutouts, and the pair of Hipercoes extend outwardly from the cage through the cutouts.

10. The card connector as claimed in claim 1, wherein said EPM comprises a plurality of adjacent magnet assemblies each having a wire, a first magnet, a second magnet, a pair of Hipercoes respectively connected with opposite ends of the first magnet and the second magnet, the first magnets in adjacent magnet assemblies are aligned with each other and have same polarities, and the second magnets in adjacent magnet assemblies are aligned with each other and have same polarities.

11. An electrical connector comprising:
    an insulative housing forming a receiving cavity communicating with an exterior along a front-to-back direction via a front opening;
    a plurality of terminals disposed in the housing with contacting sections extending into the receiving cavity;
    a metallic shell secured with the housing and covering the receiving cavity in a vertical direction perpendicular to said front-to-back direction;
    a tray removably receiving within the receiving cavity and equipped with at least a portion made from metal;
    a magnetic device activated by electricity and located at a rear end of the housing opposite to the front opening in said front-to-back direction and cooperating with the tray via magnetic forces to have said tray remain in the receiving cavity.

12. The electrical connector as claimed in claim 11, wherein said magnetic device is an EPM (Electro-Permanent Magnetic) device.

13. The electrical connector as claimed in claim 12, wherein said EPM device includes a first magnet and a second magnet activated by electricity and having either a same polarity or opposite polarities.

14. The electrical connector as claimed in claim 11, further including an urging device to constantly push the tray outwardly and forwardly when the tray is received in the receiving cavity.

15. The electrical connector as claimed in claim 14, wherein said urging device is an elastic portion unitarily formed on the shell.

16. A method of loading/unloading an electronic card with regard to an electrical connector, comprising steps of:
    providing an electrical card connector with an insulative housing forming a receiving cavity communicating with an exterior along a front-to-back direction via a front opening,
    providing a plurality of terminals in the housing with contacting sections extending into the receiving cavity;
    providing a metallic shell upon the housing for covering said receiving cavity in a vertical direction perpendicular to said front-to-back direction;
    providing a tray with a metallic portion; and
    providing a magnetic device, which is activated by electricity, around a rear end of the housing opposite to the front opening in the front-to-back direction; wherein
    during loading, the tray is inserted into the receiving cavity from the front opening to activate the magnetic device to generate a magnetic force to have the tray remain in the receiving cavity; during unloading, the magnetic device is activated to be demagnetized to remove the magnetic force.

17. The method as claimed in claim 16, wherein said magnetic device is an EPM (Electro-Permanent Magnetic) device.

18. The method as claimed in claim 17, wherein said EPM device includes a first magnet and a second magnet activated by electricity and having either a same polarity or opposite polarities.

19. The method as claimed in claim 16, further including a step of providing an elastic device to constantly urge the tray outwardly and forwardly when said tray is received in the received cavity.

20. The method as claimed in claim 19, wherein said elastic device is unitarily formed with the shell.

* * * * *